March 9, 1954   H. L. SMITH, JR., ET AL   2,671,485
FRUIT CELLING AND SEGMENTING MACHINE
Filed Aug. 3, 1951   4 Sheets-Sheet 1
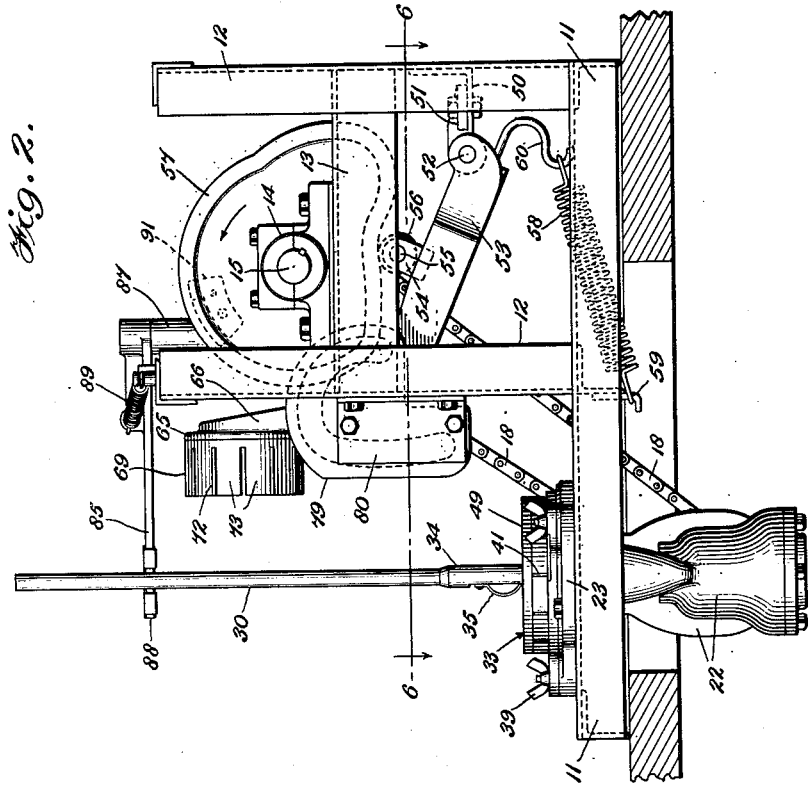
INVENTORS
*Horace L. Smith, Jr. and
Waters C. Northam,*
BY
ATTORNEY March 9, 1954  H. L. SMITH, JR., ET AL  2,671,485
FRUIT CELLING AND SEGMENTING MACHINE
Filed Aug. 3, 1951  4 Sheets-Sheet 2

INVENTORS
Horace L. Smith, Jr. and
Waters C. Northam,
BY
ATTORNEY

March 9, 1954 H. L. SMITH, JR., ET AL 2,671,485
FRUIT CELLING AND SEGMENTING MACHINE
Filed Aug. 3, 1951 4 Sheets-Sheet 4
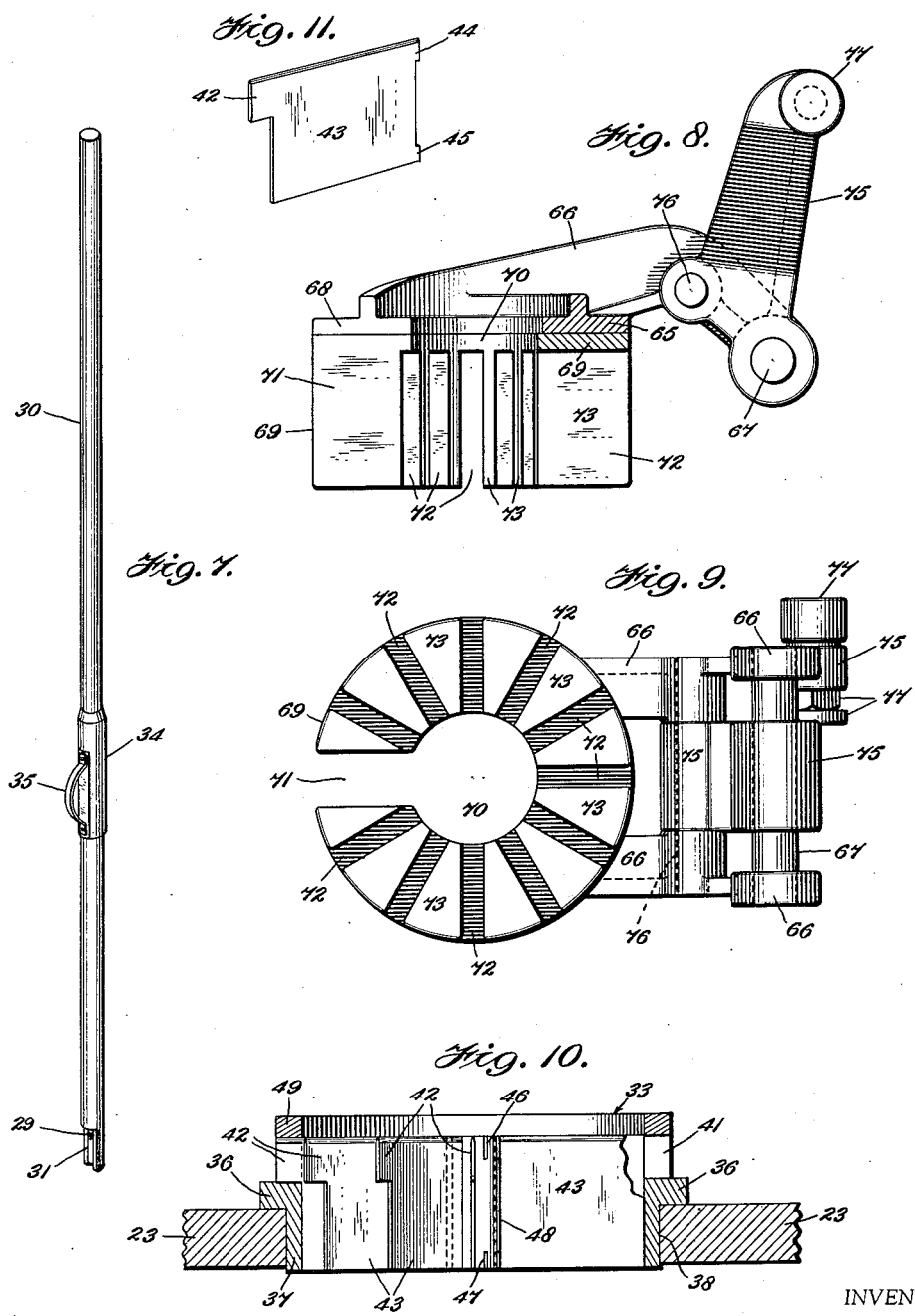
INVENTORS
Horace L. Smith, Jr. and
Waters C. Northam,
BY
ATTORNEY Patented Mar. 9, 1954

2,671,485

UNITED STATES PATENT OFFICE 2,671,485

FRUIT CELLING AND SEGMENTING MACHINE

Horace L. Smith, Jr., and Waters C. Northam, Richmond, Va., assignors to The C. H. Musselman Company, Biglerville, Pa., a corporation of Pennsylvania Application August 3, 1951, Serial No. 240,208

5 Claims. (Cl. 146—40)

The invention relates to apparatus for removing the seeds and seed cells from fruit, such as apples, and dividing the celled fruit into pieces usually although not necessarily of segmental shape, and it has for its principal object the provision of an improved machine of this character which is of relatively simple and compact construction, and which is more efficient in use than those which have been heretofore proposed.

In the preparation of apples for commercial cooking, drying, freezing and/or canning operations it is customary to first pare and core the fruit on machines designed for that purpose, the coring comprising the production of an axial bore of approximately one-half to five-eighths of an inch in diameter extending through the fruit from top to bottom. The seeds and seed cells however, for the most part lie outside the circumference of this bore, and while of course they could be removed by the coring machine by merely enlarging the diameter of the bore produced thereby, this would result in the removal and loss of appreciable amounts of desirable and usable portions of the fruit. It is therefore the usual practice to transfer the pared and cored fruit to apparatus especially designed to hollow out the interior of the fruit and thus remove the seeds and seed cells without substantial loss of usable parts thereof; and in most instances this celling apparatus is also equipped with a set of knives against which the celled fruit is pressed whereby to divide it into any desired number of parts or segments. A typical example of such machines may be found in prior U. S. Patent No. 1,825,470 granted September 29, 1931 to John Musselman.

Briefly, such machines comprise a plurality of segmenting knives radiating from an axis and fixedly mounted on the frame of the machine, and a rotatable vertical spindle extending axially upwardly through the knife assembly. At approximately the top of this assembly the spindle carries one or more radially projecting celling blades of arcuate conformation which, when a pre-cored apple has been positioned upon and slid down the spindle to rest upon the segmenting or dividing knives, cut out a generally spherical cavity in the interior of the fruit. The dimensions of the celling blade or blades of course are such as to substantially completely remove all the seeds and seed cells. The machines also embody an oscillating arm, usually cam actuated, which descends upon each apple as it reaches the dividing knives, whereby to partially impale it thereon and hold it against rotation during the celling operation. However, the prior constructions have not been such as to permit this arm to advance the apple completely through the knives and the pressure of the arm upon the next succeeding apple has been relied upon to complete the severance and discharge of the segments or pieces of the first apple.

While machines of this general type are in wide use in the canning industry, they leave something to be desired in that quite an appreciable percentage of the fruit passed through them is shattered into fragments which are not suitable for the purpose in view. Our work with such machines has strongly indicated that this shattering or fragmentation is due in part to the means and mode heretofore employed in advancing the apples through and discharging the pieces from the dividing knives, and in part to the construction of such knives; and it is one of the prime objects of the present invention to improve the construction of such elements whereby fragmentation of the fruit will be eliminated or substantially reduced.

As regards the means for advancing the fruit through the knives, this object is attained by equipping the presser arm with a fruit-engaging device having portions or projections adapted to enter between the dividing knives during a final operative movement of the arm, whereby at the conclusion of a celling operation the arm itself may be caused to directly force the fruit completely through and discharge it from the knives, without the interposition of the succeeding apple. This fruit-engaging device may conveniently comprise a block-like element provided with a plurality of slots extending upwardly from its under face and arranged in the same pattern as the dividing knives, whereby the latter may enter into the slots with the uncut-away portions of the block between the slots constituting the projections for directly advancing the fruit completely through the knives.

In a more specific aspect, the said slotted block is carried by a member which is pivotally mounted on the presser arm and is controlled by a cam whereby the oscillations of said arm will produce a wrist-like action of the fruit-engaging device which better enables the said device to be moved out of the path of the apples as they are guided to the celling position by the spindle. This wrist motion also enables the arm itself and its arc of travel to be shorter, thus appreciably reducing the overall size of the machine; and the cam controlling such motion is so designed that during the celling and segmenting operations the entire fruit-engaging device functions substantially as though it were a rigid part of the presser arm.

In the prior machines of this character the dividing knives have been soldered, brazed or welded to their supporting and positioning elements, resulting in highly irregular surfaces and protuberances at the joints, and as above indicated, fragmentation of the fruit has been caused, at least in part, by the internal strains set up therein as it was forced over such protuberances. The dividing knife unit of the present machine employs an interlocking engagement between the knives and their supporting elements which requires no soldering, brazing or welding and thus avoids the irregular joint surfaces which would result therefrom. The present construction, while providing a rigid assembly, nevertheless permits of ready disassembly for the purpose of individually sharpening or replacing the knives.

With the above mentioned and other objects in view which will appear as the description proceeds, the invention resides in the novel details of construction and combinations of parts more fully hereinafter disclosed and particularly pointed out in the appended claims.

Referring to the accompanying drawings forming part of this specification, wherein like reference characters designate like parts in all the views:

Figure 1 is an end elevational view, partly broken away and in section, of a machine constructed in accordance with and embodying the principles of the invention, the parts being illustrated in the positions they occupy at the beginning of a cycle of operation;

Fig. 2 is a side elevational view of the machine, as seen from the right of Fig. 1, the driving sprocket being omitted for the sake of clearness;

Fig. 7 is a perspective view of the fruit-receiving and guiding spindle and the celling blade carried thereby;

Fig. 8 is an enlarged longitudinal sectional view, partly in elevation, of the cam-controlled assembly carried by the presser arm for directly forcing the celled fruit through and discharging it from the segmenting knives;

Fig. 9 is an inverted plan view of the parts shown in Fig. 8;

Fig. 10 is an enlarged sectional-elevational view of the dividing knife assembly; and Fig. 11 is a perspective view of one of the dividing or segmenting knives.

Figures 3, 4:
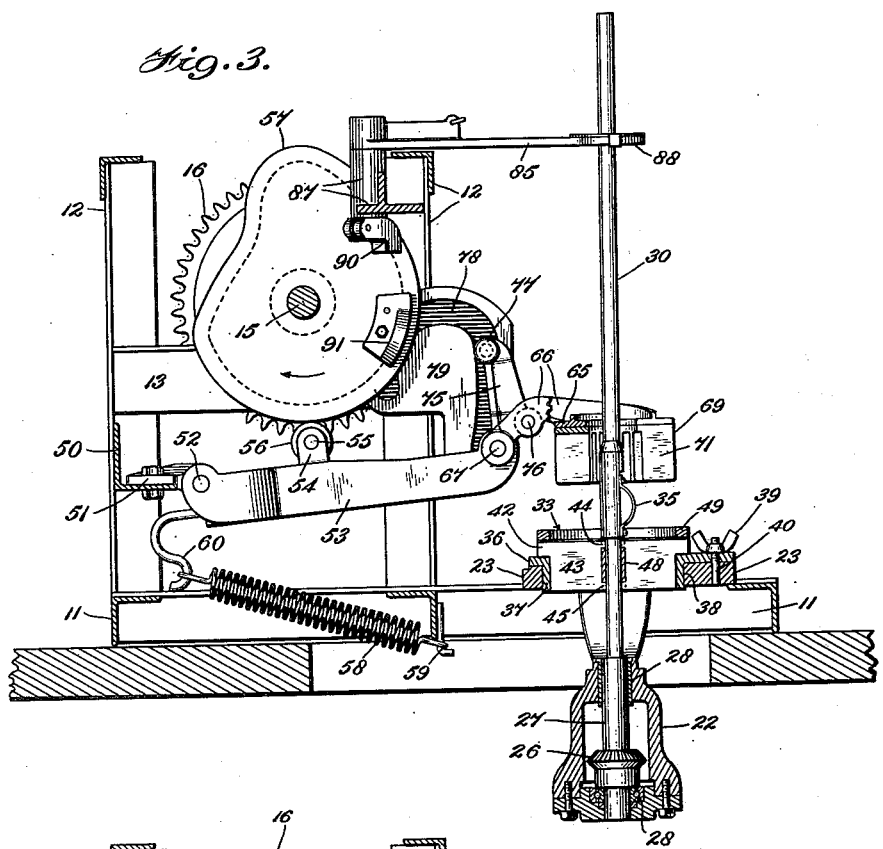
Fig. 3 is a vertical sectional view on approximately the planes indicated by the line 3—3 in Fig. 1, looking in the direction of the arrows, the parts being shown however, in substantially the positions they assume during the celling operation.
Fig. 4 is a similar sectional view on approximately the plane indicated by the line 4—4 in Fig. 1, looking in the direction of the arrows, and with the parts shown in the positions assumed following the celling operation, whereby the celled fruit is advanced completely through and discharged from the dividing knives.

Referring to the said drawings in greater detail, as here shown the machine comprises an angle-iron framework composed of a rectangular base section 11 and a superstructure 12, the latter including longitudinal members 13 upon which are mounted bearings 14 journaling the main shaft 15, one end of which is provided with a sprocket 16 by means of which the apparatus may be driven from any suitable source of power, not shown. The other end of said shaft 15 carries a sprocket 17 which is engaged by a sprocket chain 18 that extends downwardly to and is trained about a sprocket 19 carried by a horizontal shaft 20 (see Fig. 1) journaled in a member 21 constituting a part of a gear box or housing 22 that is supported by the base 11 of the frame through the medium of an upper plate-like element 23 resting upon and bolted to the longitudinal members of said base, as will be clear from Figs. 1, 2, 5 and 6.

The horizontal shaft 20 rigidly carries a bevel gear 25 which meshes with a similar gear 26 which is rigidly mounted on a vertically disposed tubular shaft 27 journaled in bearings 28 carried by the housing 22. The lower portion of the fruit receiving, guiding and celling spindle 30 mentioned above is slidably received in the hollow shaft 27, as best shown in Fig. 1, and the extreme end portion of said spindle is cut away as at 31 to provide a flat which is engageable with a transverse pin 32 carried by the hollow shaft, whereby a positive but readily disengageable driving connection is provided between the shaft and spindle. The spindle extends upwardly through the dividing knife assembly 33 and just above such assembly the spindle is slightly enlarged as at 34 and rigidly carries the arcuate celling blade 35. Engagement between the pin 32 of the tubular shaft 27 and an adjustable stop screw 29 threaded into the lower portion of the spindle 30 limits the downward movement of the spindle and insures proper positioning of the celling blade 35 with respect to the dividing knives.

Since the preparation of apples for cooking and canning it is a customary practice to divide the fruit into segments, the present dividing device has been here shown as arranged to cut the fruit into twelve segments. Obviously, a greater or less number might be provided for, and without departing from the spirit of the invention the knives could be arranged to divide the fruit into slices rather than segments, if so desired.

As will be best understood from Figs. 3, 5, 10 and 11, the dividing assembly 33 comprises a flanged annular member 36 having a lower portion 37 removably positioned in an aperture 38 formed in the plate-like member 23 of the gear box 22 and normally retained therein by wing nuts 39 engaging studs 40 carried by said member 23. The upper portion of the annulus 36 is provided with a plurality of circumferentially spaced slots 41 extending longitudinally of the annulus from its upper end face to its flange, which slots snugly but slidably receive the lugs 42 projecting outwardly from the upper portion of the outward edge of each of a series of dividing knives 43 which are disposed in radial positions within the annulus. The upper and lower portions of the inward edges of said knives are provided with similar lugs 44 and 45 which are snugly receivable and frictionally retainable in complementary slots 46 and 47 formed in the upper and lower portions respectively of a tubular sleeve 48 through which the lower portion of the spindle 30 freely passes, as shown in Fig. 3.

In assembling this dividing device, the lugs 44 and 45 of the several knives are inserted and frictionally held in the slots 46 and 47 of the sleeve 48, providing a unit which may then be introduced longitudinally into the annulus 36 to engage and seat the outer lugs 42 of the knives in the slots 41 of said annulus, whereupon a retaining ring 49 is secured against the upper face of the annulus to firmly maintain the parts in position. The entire assembly may then be disposed on the plate 23 with the lower portion 37 of the annulus 36 engaging in the hole 38 in said plate, and secured against displacement by the nuts 39. It will be readily appreciated that the construction just described provides for the ready removal of the knives 43 for individual sharpening or replacement if necessary.

The superstructure of the framework includes a transverse member 50 upon which is rigidly mounted a bracket 51 carrying a shaft 52 on the ends of which is journaled the rearward end of the presser arm 53. The said arm is provided with a pair of lugs 54 mounting a pin 55 on which is journaled a cam follower 56, here shown as comprising a pair of ball bearings arranged end to end. Said follower engages the operative face of a cam 57 rigidly mounted by the main shaft 15 and of substantially the conformation shown in Figs. 2, 3 and 4, such engagement being maintained by a tension spring 58, one end of which is anchored to the base 11 at 59 while its other end is connected to a hook member 60 rigidly carried by the arm 53.

The forward end of the presser arm 53 carries a device which, as a result of the action of cam 57, sequentially engages the top of a pre-cored apple which has been dropped down the spindle 30 to rest upon the sharpened edges of dividing knives 43, presses such apple against said blades to partially impale it thereon and thus prevent its rotation during the celling operation performed by the blade 35, and at the conclusion of such operation directly forces such celled apple completely past said knives to immediately complete its division into segments or slices, without the interposition of a succeeding apple. The division is accomplished with a minimum or complete absence of shattering of the fruit into unusable fragments, and the segments or slices are discharged from the lower end of the dividing device into any suitable receptacle which may be disposed below the gear box 22.

While in a broad aspect of the invention the fruit-engaging and pressing device just mentioned may be rigidly carried by the forward end of the presser arm 53, this would necessitate an appreciably longer travel of the said arm in order that the pressing device might clear the apples as they descend upon the spindle 30 and therefore the here-shown construction, whereby the said device is pivotally carried by the presser arm and controlled by a cam to secure a wrist-like action, is preferred as it enables the overall size of the machine to be materially reduced and contributes to the efficiency of the action of pressing the apples through the dividing device without shattering.

As will be best understood from Figs. 3, 4, 6, 8 and 9, the fruit-engaging and pressing device comprises a generally annular plate 65 from the top of which a pair of legs 66 extend rearwardly for pivotal attachment to the forward end of the presser arm 53, as by a pin 67. The forward portion of the plate 65 is provided with a radial slot 68 of a width to accommodate passage of the spindle 30 therethrough, and to the under surface of the plate there is secured a cylindrical element 69 having an axial bore 70 and a radial slot 71 alined with the plate slot 68 and serving the same purpose. The element 69 is also provided with a plurality of radial slots 72 extending upwardly from its lower face to adjacent its top, such slots being arranged in the same pattern as the dividing knives 43 whereby they may freely receive the knives when the pressing device is moved to its lowermost position shown in Fig. 4. When so lowered the uncutaway segments 73 between the slots constitute projections which enter the spaces between the knives and directly force the celled fruit all the way through said spaces, thereby completing its division without the interposition of the succeeding apple.

The pin 67 which pivotally connects the pressing device to the arm 53 also mounts an upstanding arm 75 disposed between the legs 66 of said device and secured thereto by a pin 76 to prevent relative movement between the two. The upper end of said arm 75 mounts a cam follower 77 which is received in the groove 78 of a cam 79 which is rigidly attached to the superstructure 12 of the frame by an angle bracket 80. The cam groove 78 is shaped substantially as shown in Figs. 3 and 4, and its action upon the follower 77 and arm 75 is such that as the presser arm 53 is oscillated by the rotary cam 57 and spring 58, a wristlike motion is imparted to the fruit pressing device 65, 66, 69 which successively moves such device to the several positions illustrated in Figs. 2, 3 and 4. Obviously, in the Fig. 2 position the pressing device is completely out of the path of fruit descending on the spindle 30, but as such fruit reaches the top of the dividing device 33, downward movement of the presser arm 53 will, through the action of fixed cam 79 upon the arm 75, move the pressing device to the position shown in Fig. 3 and subsequently to that shown in Fig. 4. In the Fig. 3 position the bottom of the pressing element 69 is in engagement with the top of the apple, pressing the latter against the knives 43 to partially impale it thereon, and the cam 57 permits said element to dwell in this position throughout the celling action of the blade 35. At the conclusion of this operation, cam 57 further depresses the arm 53 to move the element 69 to the Fig. 4 position within the dividing device 33, thereby immediately severing the celled apple into segments or slices, as above explained. The cam 57 then permits the arm 53 to rise to return the pressing device to the Fig. 2 position in a single motion, whereupon another apple may be slid down the spindle 30 and the cycle repeated.

Usually the apples are manually fed to the spindle 30 and while skilled operators can supply them in reasonably accurate timed relation to the cycles of the machine, it is preferred to equip the latter with a feeding device which will insure that not more than one apple reaches the celling position during each cycle. Therefore, while such devices are not broadly novel in this class of machine, one exemplification thereof has been shown in Figs. 1, 2, 3 and 5.

As here illustrated such mechanism comprises a horizontally disposed arm 85 rigidly carried by a vertical shaft 86 which is journaled in a bracket 87 carried by the upper portion of the superstructure 12 of the frame. The forward end of said arm is provided with a semi-annular head 88 arranged to normally partially surround the spindle 30, as clearly shown in said figures, being biased to such position by a spring 89. The lower end portion of the shaft 86 rigidly carries a dog 90 which is disposed in the path of a camming lug 91 carried by the rotary cam 57.

Figure 5:
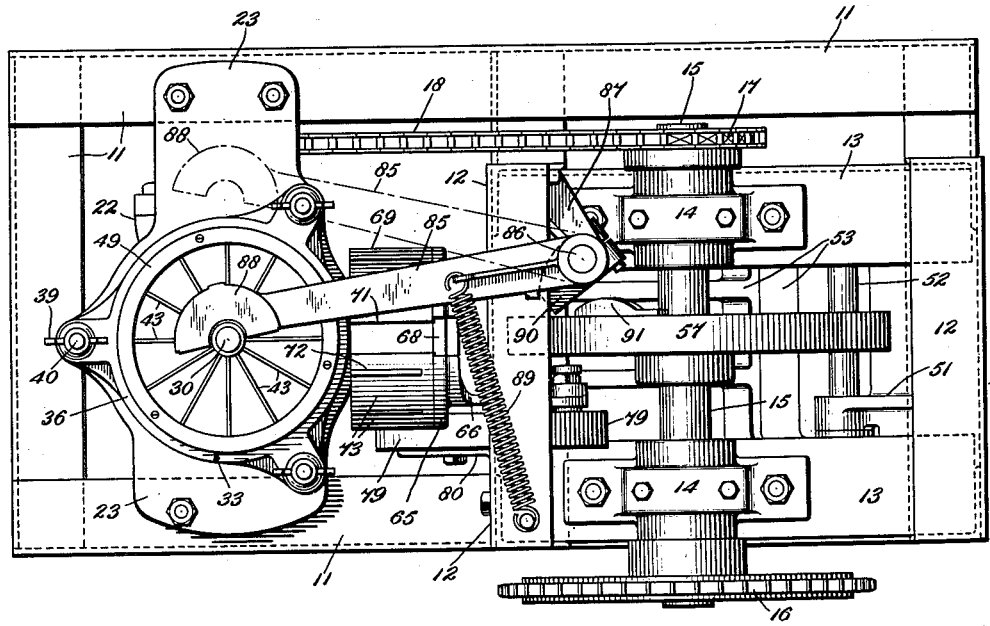
Fig. 5 is a plan view of the machine on a slightly enlarged scale, looking down on Fig. 2.
Figure 6:
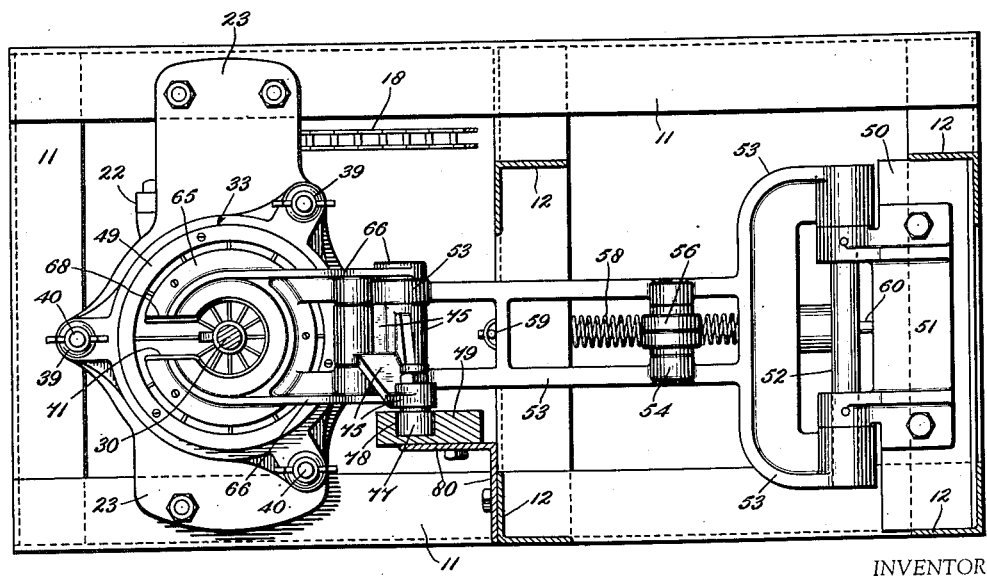
Fig. 6 is a horizontal sectional view, also on a somewhat enlarged scale, on approximately the plane indicated by the line 6—6 in Fig. 2, the parts however being illustrated in substantially the positions shown in Fig. 4.

In the normal position of the arm 85 its head 88 is so disposed as to arrest downward movement of apples threaded upon the upper end of spindle 30, but as the pressing device 65, 69 reaches approximately the position shown in Figs. 1 and 2, the camming lug 91 engages the dog 90 to thereby swing the vertical shaft 86 and feed controlling arm 85 to the broken line position shown in Fig. 5. The engagement between the lug 91 and dog 90 is of only such duration as to permit one apple to drop past the arm 85, which is immediately returned to its normal position by the spring 89. As this action occurs only once per cycle of the machine and is in properly timed relation to the other functioning thereof, supply of more than one apple per cycle to the celling and segmenting devices is prevented.

While one form of the invention has been illustrated and described, it is obvious that those skilled in the art may vary the details of construction and precise arrangement of parts without departing from the spirit of the invention and therefore it is not wished to be limited to the above disclosure except as may be required by the appended claims.

What is claimed is:

1. In a machine for removing the seeds and seed cells from pre-cored fruit and dividing the celled fruit into sections, the combination of a frame; a dividing device mounted thereon and comprising a plurality of spaced knives; a rotatably mounted spindle extending through said dividing device, for serially receiving and guiding the pre-cored fruit thereto, said spindle being provided with a celling blade adjacent said device; means for rotating said spindle; a presser mechanism comprising an arm oscillatably mounted on the frame for movement of its free end toward and from said dividing device, said free end having a fruit engaging device pivotally carried thereby, such device having spaced projections arranged for entry between the dividing knives; means for oscillating said presser mechanism, comprising a cam mounted on the frame and operating on the presser arm, said cam having sequentially functioning portions formed to cause said mechanism to engage and initially maintain each piece of fruit supplied to the dividing device partially impaled upon the knives thereof during the celling operation of the celling blade, and following such operation to advance the presser mechanism to enter the projections of the fruit engaging device into the spaces between the dividing knives, whereby to directly force the celled fruit completetly past said knives; and additional cam means carried by the frame and engaged by said pivoted fruit engaging device, whereby to induce oscillating movement thereof relative to the presser arm as the latter is oscillated by the first named cam.

2. In a machine for removing the seeds and seed cells from pre-cored fruit and dividing the celled fruit into sections, the combination of a frame; a dividing device mounted thereon and comprising a plurality of spaced knives; a rotatably mounted spindle extending through said dividing device, for serially receiving and guiding the pre-cored fruit thereto, said spindle being provided with a celling blade adjacent said device; means for rotating said spindle; a presser mechanism comprising an arm oscillatably mounted on the frame for movements toward and from said dividing device, said arm having a fruit engaging device pivotally carried thereby, which device includes an element having spaced projections arranged for entry between the dividing knives; means for oscillating said presser mechanism comprising a cam rotatably mounted on the frame and engaging a part of the presser arm and having sequentially functioning portions formed to cause said mechanism to engage and initially maintain each piece of fruit partially impaled upon the knives thereof during the celling operation of the celling blade, and subsequent to such operation to advance the presser mechanism to enter the projections of the fruit engaging device into the spaces between the dividing knives, whereby to directly force the celled fruit completely past said knives; and additional cam means mounted on the frame and acting on said fruit engaging device, such cam means having portions inducing oscillating movement of said device relative to the presser arm during a part of each oscillation of the latter, and other portions maintaining a substantially constant relationship between said device and arm during another part of the travel of the latter.

3. In a machine for removing the seeds and seed cells from pre-cored fruit and dividing the celled fruit into sections, the combination of a frame; a dividing device mounted thereon and comprising a plurality of spaced knives; a rotatably mounted spindle extending through said dividing device, for serially receiving and guiding the pre-cored fruit thereto, said spindle being provided with a celling blade adjacent said device; means for rotating said spindle; a presser mechanism comprising an oscillatably mounted arm having a fruit engaging device mounted thereon and movable relative thereto, said device having a slot whereby it may be moved to and from a position straddling said spindle to engage fruit threaded thereon; means for oscillating said presser mechanism whereby to move said engaging device toward and from the dividing device, said means comprising a cam engaging a part of the presser arm and having sequentially functioning portions formed to move said mechanism from a fruit feeding position successively to a fruit celling position, a fruit dividing position, and then back to said feeding position; and additional cam means acting on said fruit engaging device, such cam means having portions maintaining a substantially constant relationship between said device and its carrying arm at and between said celling and dividing positions, and other portions inducing reciprocating movement of the device relative to the arm during travel of the mechanism between the celling and feeding positions, whereby to withdraw said device from and return it to its position straddling the spindle to avoid interference with fruit passing along the spindle to the dividing device.

4. In a machine for removing the seeds and seed cells from pre-cored fruit and dividing the celled fruit into sections, the combination of a frame; a dividing device mounted thereon and comprising a plurality of spaced knives; a rotatably mounted spindle extending through said dividing device, for serially receiving and guiding the pre-cored fruit thereto, said spindle being provided with a celling blade adjacent said device; a presser mechanism comprising an oscillatably mounted arm and a fruit engaging device pivotally carried thereby, said device having a lateral slot whereby it may be moved to and from a position straddling said spindle to pressurally engage fruit threaded on the latter; means for oscillating said presser mechanism whereby to move said engaging device toward and from the dividing device, said means comprising a rotatable cam engaging a part of the presser arm and having sequentially functioning portions formed to move said mechanism from a fruit feeding position removed from the dividing device successively to a fruit celling position adjacent such device, a fruit dividing position at such device, and then back to said feeding position; means for rotating said cam and spindle; a second cam, fixedly carried by the frame and engaged by a portion of the fruit engaging device, such cam having portions maintaining a substantially constant relationship between said engaging device and its carrying arm at and between said celling and dividing positions, and other portions inducing oscillating movement of the device relative to the arm during travel of the mechanism between the celling and feeding positions, whereby to withdraw said device from and return it to its position straddling the spindle to avoid interference with fruit passing along the spindle to the dividing device.

5. In a machine for removing the seeds and seed cells from pre-cored fruit and dividing the celled fruit into sections, the combination of a frame; a dividing device mounted thereon and comprising a plurality of spaced knives; a rotatably mounted spindle extending through said dividing device, for serially receiving and guiding the pre-cored fruit thereto, said spindle being provided with a celling blade adjacent said device; means for rotating said spindle; a presser mechanism comprising an oscillatably mounted arm and a fruit engaging device pivotally carried thereby, said device including an element having spaced projections arranged for entry between the knives of the dividing device, said element also having a slot whereby it may straddle said spindle; means for oscillating said presser mechanism, comprising a cam engaging a part of the presser arm and having sequentially functioning portions formed to successively move said mechanism into pressural engagement with each piece of fruit supplied to the dividing device, maintain it partially impaled upon the knives thereof during the celling operation of the celling blade, and then to advance the presser mechanism to substantially enter the projections thereof into the spaces between the dividing knives, whereby to directly force the celled fruit completely past said knives; and additional cam means acting on said fruit engaging device, such cam means having portions maintaining a substantially constant relationship between such device and the presser arm during the celling and dividing operations, and other portions inducing oscillating movement of said device relative to the arm subsequent to the dividing operation, whereby to withdraw the device from and return it to its position straddling the spindle to permit passage of another piece of fruit along the spindle to the dividing device.

HORACE L. SMITH, Jr.
WATERS C. NORTHAM.

References Cited in the file of this patent

UNITED STATES PATENTS

| Number | Name | Date |
|---|---|---|
| 51,479 | Reed | Dec. 12, 1865 |
| 507,383 | O'Connell | Oct. 24, 1893 |
| 1,753,371 | Georgopoulos | Apr. 8, 1930 |
| 1,825,470 | Musselman | Sept. 29, 1931 |
| 2,397,007 | Hosmer | Mar. 19, 1946 |
| 2,509,781 | Pease | May 30, 1950 |
| 2,513,341 | Marasco | July 4, 1950 |